United States Patent
Kinoshita et al.

(10) Patent No.: US 7,790,344 B2
(45) Date of Patent: Sep. 7, 2010

(54) METHOD OF PREPARING POWDER AND TONER FOR ELECTROPHOTOGRAPHY, AND TONER THEREFOR

(75) Inventors: Naotoshi Kinoshita, Numazu (JP);
Tetsuya Tanaka, Shizuoka-ken (JP);
Masahiro Kawamoto, Shizuoka-ken (JP)

(73) Assignee: Ricoh Company Limited, Tokyo (JP)

(*) Notice: Subject to any disclaimer, the term of this patent is extended or adjusted under 35 U.S.C. 154(b) by 128 days.

(21) Appl. No.: 12/111,486

(22) Filed: Apr. 29, 2008

(65) Prior Publication Data
US 2008/0277490 A1     Nov. 13, 2008

(30) Foreign Application Priority Data
May 10, 2007  (JP) .............................. 2007-125327
Feb. 29, 2008  (JP) .............................. 2008-049121

(51) Int. Cl.
*G03G 9/08* (2006.01)
*A62C 5/02* (2006.01)

(52) U.S. Cl. ................... 430/137.1; 239/8; 239/11; 239/270; 239/295; 239/296; 239/708

(58) Field of Classification Search .............. 430/137.1; 239/8, 11, 270, 295, 296, 572, 705, 708
See application file for complete search history.

(56) References Cited

U.S. PATENT DOCUMENTS 3,997,113 A * 12/1976 Pennebaker, Jr. ............ 239/708
5,024,695 A    6/1991 Ashdown et al.
5,114,470 A    5/1992 Biancaniello et al.
2005/0112492 A1 * 5/2005 Makino et al. ......... 430/137.18
2006/0032952 A1 2/2006 Kawamoto et al.
2006/0222980 A1 10/2006 Makino et al.
2008/0063968 A1 3/2008 Kinoshita et al.

FOREIGN PATENT DOCUMENTS

| JP | 2000-254554 | 9/2000 |
| JP | 2000-312817 | 11/2000 |
| JP | 2003-1090 | 1/2003 |
| JP | 2004-226668 | 8/2004 |
| JP | 2005-258394 | 9/2005 |

* cited by examiner

*Primary Examiner*—Hoa V Le
(74) *Attorney, Agent, or Firm*—Oblon, Spivak, McClelland, Maier & Neustadt, L.L.P.

(57) ABSTRACT

A method of preparing a powder, including bombarding a spray gas to a liquid material through a spray nozzle to form an atomized liquid material; and solidifying the atomized liquid material, wherein 5 to 40% by weight of the spray gas are previously mixed with the liquid material to form a two-phase flow in a flow path of the spray nozzle, and 60 to 95% by weight of the spray gas is further discharged from a circumference of the flow path discharging the two-phase flow and bombarded thereto to uniformly atomize the liquid material.

9 Claims, 7 Drawing Sheets

SPRAY GAS FOR FORMING A TWO-PHASE FLOW

FIG. 6

SPRAY GAS

LIQUID MATERIAL

METHOD OF PREPARING POWDER AND TONER FOR ELECTROPHOTOGRAPHY, AND TONER THEREFOR

BACKGROUND OF THE INVENTION

1. Field of the Invention

The present invention relates to an overall field requiring spray granulation such as spray dry and melting granulation for preparing, e.g., chemical products, medicines, foods and inorganic powders, and more particularly to a toner for electrophotography.

2. Discussion of the Background

A conventional spray granulation apparatus sprays various materials into a chamber collecting the resultant particles to prepare a particulate, a powdery or a granular product of the materials.

For example, a liquid material formed by dissolving a material in a solvent, dispersing a material in the shape of a slurry therein or melting a material upon application of heat is sprayed in a granulation chamber through a spray nozzle; and the solvent is dried or the melted material is cooled to form solid particles.

A rotation disc nozzle is used to prepare particles having a large particle diameter, e.g., greater than 100 µm, and a two-phase spray nozzle externally mixing is used to prepare particles having a small particle diameter less than 100 µm.

Japanese published unexamined application No. 2005-258394 discloses a method of preparing a toner, wherein after or while a kneaded toner material is melted with a melter, the melted material is sprayed through a high-pressure gas nozzle while discharged in a chamber. Japanese published unexamined application No. 2004-226668 discloses a method of preparing a toner, wherein a dispersion including a finely-dispersed toner material is sprayed with a spray nozzle and solidified while passed through a solidifier to form particles. However, Japanese published unexamined applications Nos. 2005-258394 and 2004-226668 had a problem of clogged nozzle.

Japanese published unexamined application No. 2000-312817 discloses a method of removing a solidified material at the exit of the nozzle with a needle mechanically positioning from the liquid side in order to solve a problem of clogged spray nozzle in a granulation apparatus spraying a liquid material in a granulation chamber therein.

However, when a mechanical cleaner such as a needle is installed in the apparatus, the needle needs to be sealed against the liquid and the nozzle has a complicate structure. First of all, this aims at how to recover a nozzle which is clogged or being clogged and simply a stopgap measure.

Thus, although the spray nozzle is an important element for a spray granulator, the spray nozzle has a large problem of being clogged.

The clogged spray nozzle largely affects controlling particle diameter and particle diameter distribution of the particles produced thereby. When the spray nozzle is clogged, spray conditions of a liquid is disrupted, resulting in generation of coarse particles and a broad particle diameter distribution.

Particularly, a toner is required to have a small particle diameter a particle diameter distribution as sharp as possible. Therefore, generation of coarse particles and a broad particle diameter distribution are fatal problems for preparing a toner by the sprat granulation method.

Because of these reasons, a need exists for a method of preparing a quality toner without clogging the spray nozzle.

SUMMARY OF THE INVENTION

Accordingly, an object of the present invention is to provide a spray granulation method capable of stably and uniformly spraying a liquid material without clogging the nozzle to prepare a toner having a narrow particle diameter distribution.

Another object of the present invention is to provide a toner prepared by the method.

These objects and other objects of the present invention, either individually or collectively, have been satisfied by the discovery of a method of preparing a powder, comprising:

bombarding a spray gas to a liquid material through a spray nozzle to form an atomized liquid material; and solidifying the atomized liquid material, wherein 5 to 40% by weight of the spray gas are previously mixed with the liquid material to form a two-phase flow in a flow path of the spray nozzle, and 60 to 95% by weight of the spray gas is further discharged from a circumference of the flow path discharging the two-phase flow and bombarded thereto to uniformly atomize the liquid material.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawing(s) in which like reference characters designate like corresponding parts throughout and wherein.

DETAILED DESCRIPTION OF THE INVENTION

The present invention provides a spray granulation method capable of stably and uniformly spraying a liquid material without clogging the nozzle to prepare a toner having a narrow particle diameter distribution. More particularly, the present invention provides a method of preparing a powder, comprising:

bombarding a spray gas to a liquid material through a spray nozzle to form an atomized liquid material; and solidifying the atomized liquid material, wherein 5 to 40% by weight of the spray gas are previously mixed with the liquid material to form a two-phase flow in a flow path of the spray nozzle, and 60 to 95% by weight of the spray gas is further discharged from a circumference of the flow path discharging the two-phase flow and bombarded thereto to uniformly atomize the liquid material.

In the present invention, a liquid material (a spray liquid, i.e., water or an organic solvent, or a solution or a slurry which is water or the organic solvent including other materials dissolved or dispersed therein) and a part of a spray gas are previously mixed to form a two-phase flow including a gas and a liquid, and the two-phase flow and a spray gas (main flow) from a circumference of a flow path discharging the two-phase flow are bombarded each other to atomize the liquid material.

Air is mostly used as the spray gas, and a steam or an inactive gas such as nitrogen may be used according to the application.

Since the liquid material is included in the two-phase flow before discharged from the nozzle, the fluid increases in volume and substantially accelerates its exit velocity to prevent the nozzle from being clogged with agglutinated solids in the liquid material.

Further, since the two-phase flow and the spray gas from a circumference of a flow path discharging the two-phase flow are bombarded each other, a wall of the gas flow is formed at the exit of the nozzle, and which prevents the liquid material from scattering around and adhering to the exit of the nozzle. Consequently, the wall prevents the nozzle from being clogged with agglutinated solids in the liquid material.

The air used for forming the two-phase flow is a part of the air used for the spray gas, and no extra air is needed to form the two-phase flow. A ratio of the gas used for forming the two-phase flow is preferably from 5 to 40% by weight, more preferably from 10 to 30% by weight, and furthermore preferably from 10 to 20% by weight based on total weight of the spray gas. In other words, a ratio of the spray gas (main flow) discharging from a circumference of a flow path discharging the two-phase flow to be bombarded thereto is preferably from 95 to 60% by weight, more preferably from 90 to 70% by weight, and furthermore preferably from 90 to 80% by weight based on total weight of the spray gas.

An amount of the spray gas is a sum of amounts of the spray gas (main flow) and the gas used for forming the two-phase flow.

When the ratio of the gas used for forming the two-phase flow is too low, a uniform two-phase flow is not formed and the liquid material is not properly atomized occasionally.

When the ratio of the gas used for forming the two-phase flow is too high, the spray gas (main flow) does not have such a dispersion energy as to further atomize the two-phase flow atomized to some extent, resulting in atomization lower than that when the ratio is within the preferable range.

FIG. 1 is a schematic view illustrating a cross-section of a nozzle for use in the method of preparing a powder of the present invention.

A liquid material such as a slurry material is mixed with a gas for forming a two-phase flow, which is partially separated from a spray gas, in a nozzle and is primarily dispersed to form a two-phase flow. The two-phase flow is transported to an exit of the nozzle while accelerated. Further, at the exit of the nozzle, the two-phase flow is bombarded to a spray gas (main flow) discharging at high-speed while inflating to be atomized. The spray gas is discharged from an exit formed at a circumference of an exit of the two-phase flow.

Since the liquid material is mixed with a gas for forming a two-phase flow and is primarily dispersed to form a two-phase flow, and which is accelerated, clogging of the nozzle can be prevented. In addition, since a wall of the gas flow is formed at the exit of the nozzle, adherence of the liquid material thereto can also be prevented.

An inner mixing type two-fluid spray nozzle is typically known as a sprayer spraying while forming a two-phase flow. FIG. 6 is a schematic view illustrating a cross-section of a nozzle for use in a conventional method of preparing a powder. For example, a material slurry is mixed with a spray gas in a nozzle to form a two-phase flow, and which is accelerated and further accelerated at the exit of the nozzle with an inflation of the spray gas. On the other hand, an outer mixing type spray nozzle is typically known as a spray nozzle spraying with a spray gas without forming a two-phase flow. FIG. 7 is an embodiment of the outer mixing type spray nozzle. For example, a material slurry is bombarded to a spray gas discharging at high speed while inflating at the exit of the nozzle, and the slurry is accelerated and atomized. In FIG. 7, the spray gas is fed as a swirling flow.

Not having a wall of a gas flow at a circumference of the exit of the liquid (two-phase flow) as the outer mixing type nozzle, the inner mixing type two-fluid spray nozzle has a disadvantage of probable adherence of solids of the liquid to the exit of the nozzle and clogging thereof.

The outer mixing type spray nozzle has very low transportability of the liquid material because of a low suction power such as a liquid pressure with a pump feeding the liquid and a siphon effect. In addition, the liquid has a flow speed lower than that of the inner mixing type, and therefore the outer mixing type spray nozzle has a disadvantage of probable clogging in the nozzle. Particularly, the outer mixing type spray nozzle is likely to be clogged when spraying a slurry material which tends to have a sediment and an agglutinate.

Since the conventional spray nozzle in FIG. 6 or 7 does not have a wall of gas flow at the exit of the nozzle or a transferer transferring a liquid material into the nozzle, they are likely to be clogged in and out of the nozzle more than that of the present invention when applied to a spray granulator. Namely, the spray granulation methods using the conventional nozzles prepare particles having a wide particle diameter distribution or including many coarse particles.

The spray granulation method of the present invention using the nozzle which is not clogged easily prepares fine particles or a powder having a narrow particle diameter distribution and not including coarse particles.

FIG. 2 is a process flow of the spray granulation method of preparing a powder of the present invention, which may be the same as those of conventional methods. A liquid material is fed from a material holder by a pump to a spray nozzle. At the same time, a spray gas is fed thereto. The temperature of the spray gas is optionally adjusted. Nozzles shown in FIGS. 1, 3 and 4 can be used as the spray nozzle. The liquid material is sprayed from the spray nozzle into a collection chamber. A droplet of the liquid material is transferred by a transfer airflow fed by an air blower to a collector, where the droplet is collected as a product. The temperature of the transfer airflow may optionally be adjusted. In addition, the droplet may optionally exchange heat therewith and discharge a volatile component thereto.

Figure 2:
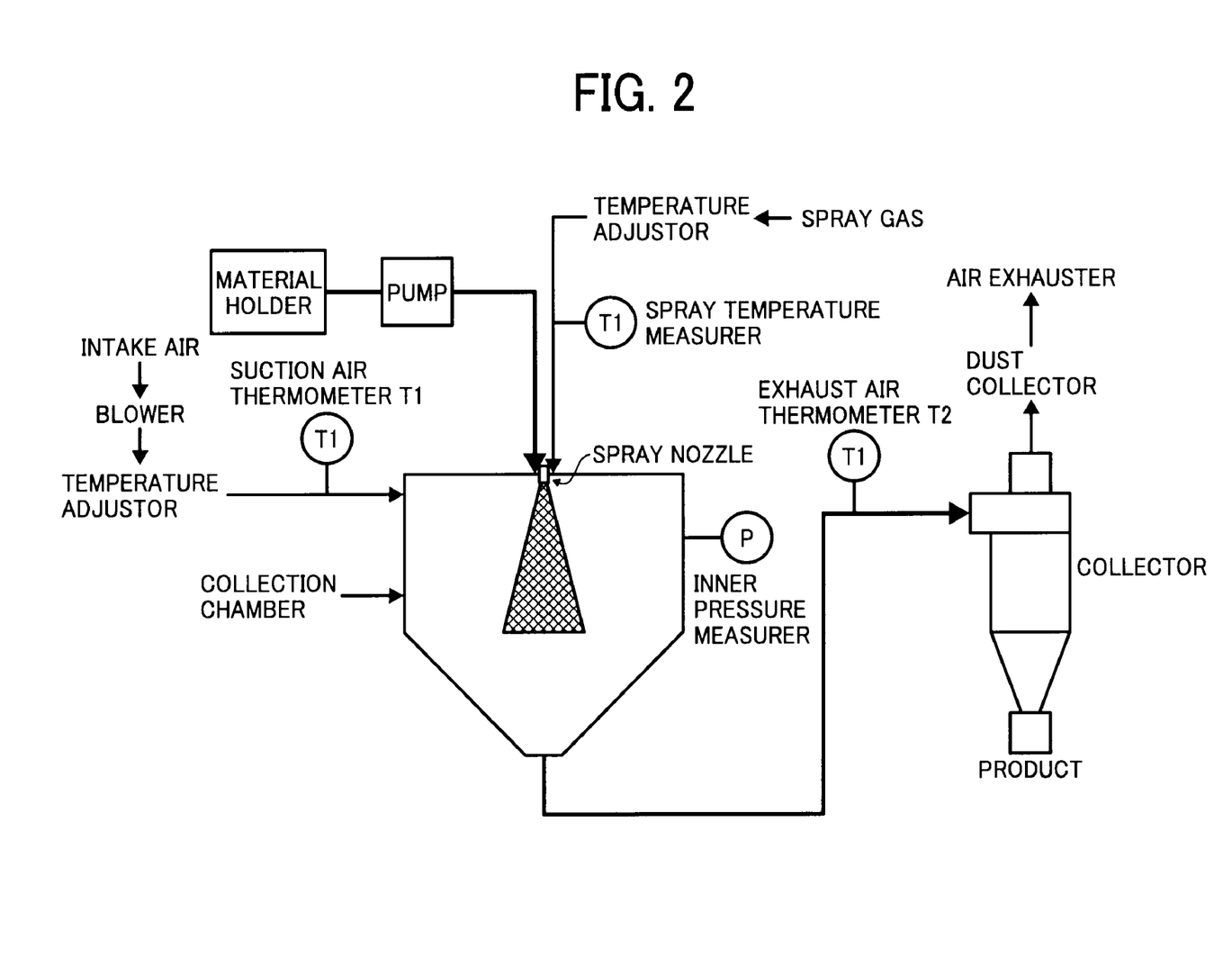
FIG. 2 is a process flow of the spray granulation method of preparing a powder of the present invention.
Figure 6:
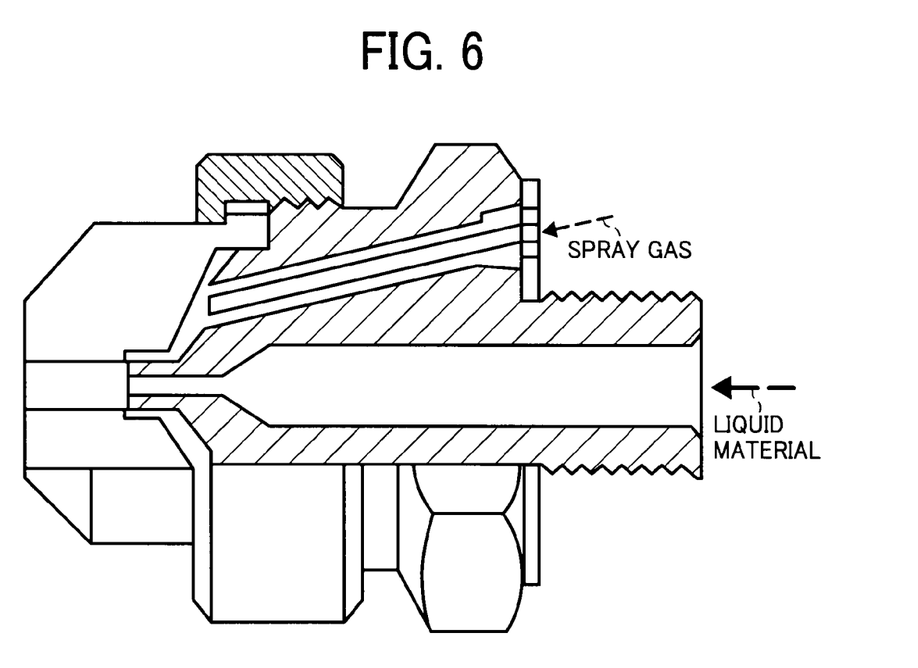
FIG. 6 is a schematic view illustrating a cross-section of a nozzle for use in a conventional method of preparing a powder.
Figure 7:
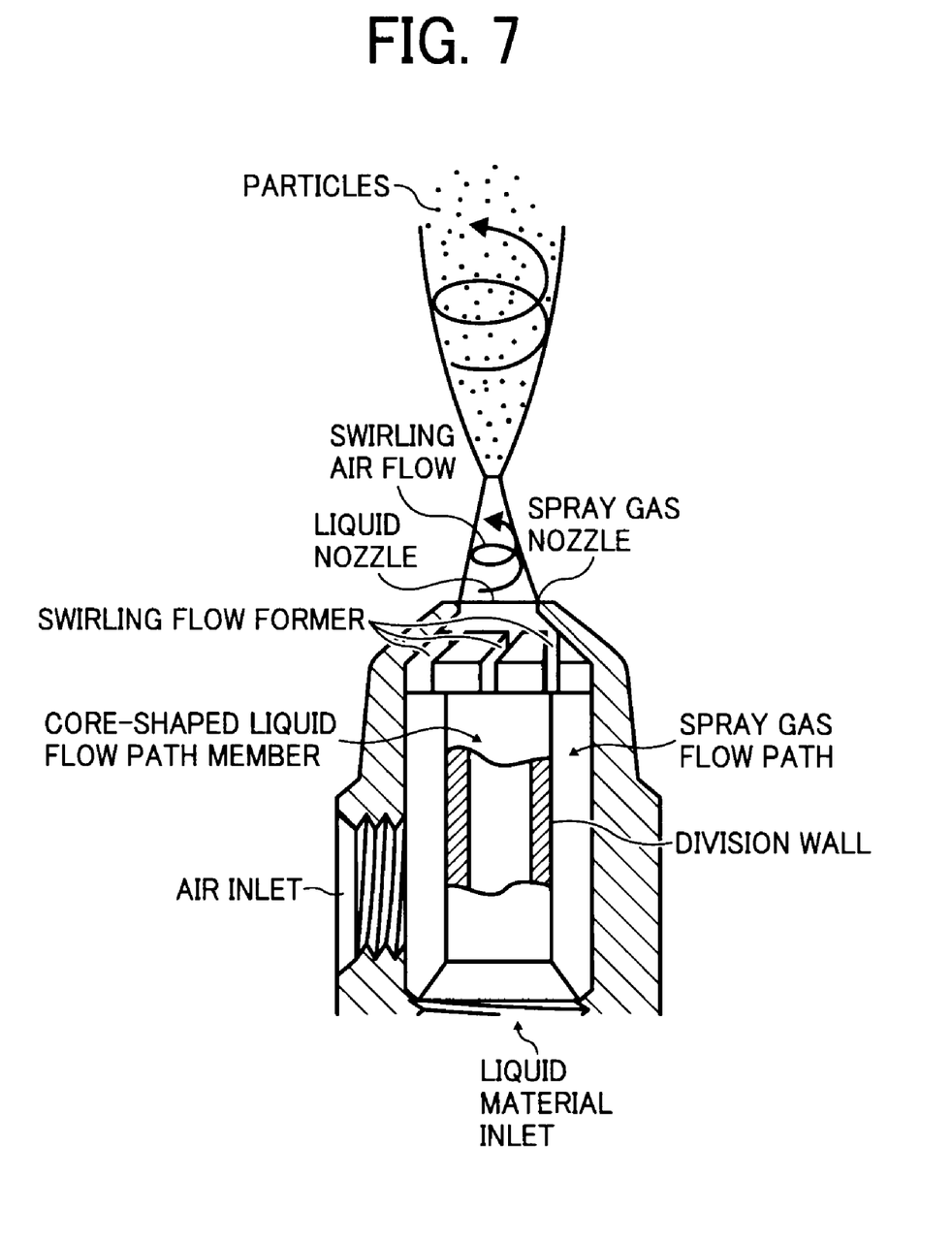
FIG. 7 is a schematic view illustrating a cross-section of another nozzle for use in a conventional method of preparing a powder.

When the nozzle in FIG. 6 or 7 is used in the process flow of FIG. 2, the spray granulation method is same as those of conventional methods.

Figure 3:
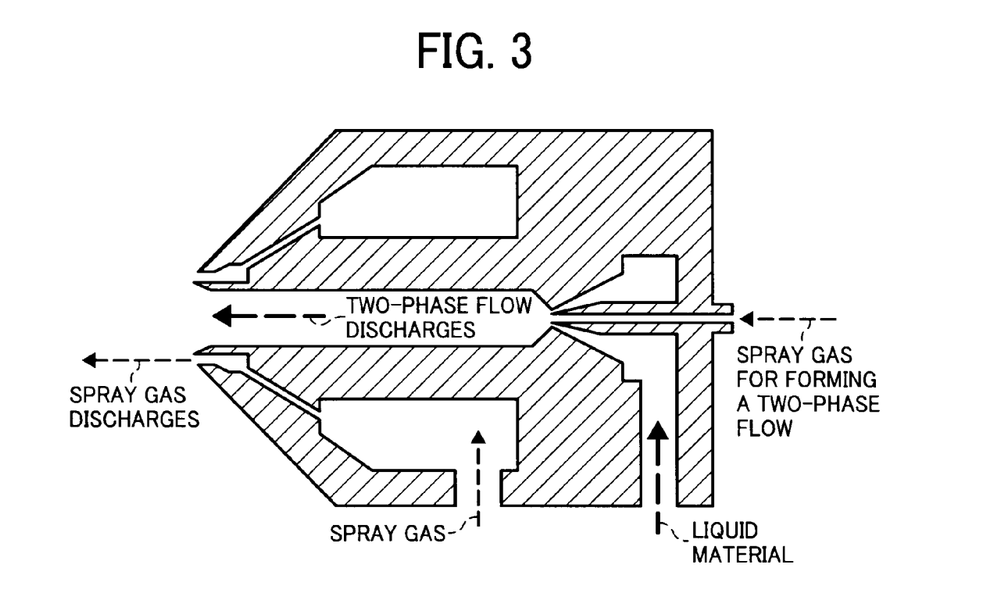
FIG. 3 is a schematic view illustrating a cross-section of another nozzle for use in the method of preparing a powder of the present invention.
Figure 4:
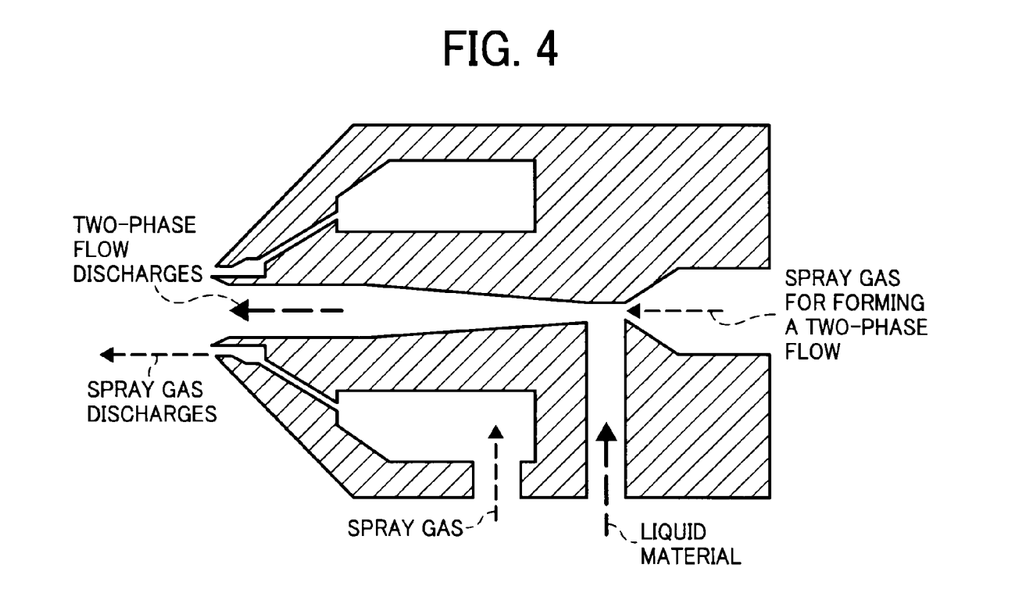
FIG. 4 is a schematic view illustrating a cross-section of a further nozzle for use in the method of preparing a powder of the present invention.

FIG. 3 is a schematic view illustrating a cross-section of venturi nozzle. FIG. 4 is a schematic view illustrating a cross-section of an ejector nozzle. A ring nozzle has almost the same structure as that of the venturi nozzle except that a flow path of the spray gas for forming a two-phase flow is replaced with that of the liquid material. The venture, ejector and ring nozzle can efficiently form a well-dispersed two-phase flow and prevent the spray gas from flowing back to the liquid material feed pipe.

In the inner mixing type two-fluid spray nozzle or the spray nozzle of the present invention, when the pressure of a liquid flow path is not properly adjusted in forming a two-phase flow, e.g., when a feeding pressure of the liquid material is too small compared with that of the spray gas, the spray gas possibly flows back to the liquid material feed pipe.

However, when the venture, ejector or ring nozzle is used for forming a two-phase flow, the spray gas does not flow back to the liquid even when the feeding pressure thereof is smaller than that of the spray gas, and rather suctions the liquid material and transfers that to the exit.

Any other nozzles besides the above-mentioned nozzles, which prevents the liquid from flowing back and preferably applies a propulsive force to the liquid toward the exit may be used.

Figure 5:
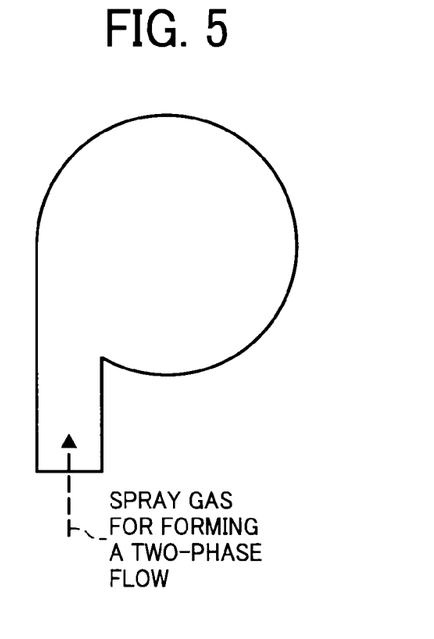
FIG. 5 is a vertical sectional view of the nozzle in FIG. 1.

The two-phase flow may be a swirling flow. For example, the mixing chamber of the spray gas for forming a two-phase flow and the liquid material in FIG. 1 becomes eccentric as shown in FIG. 5 to form a swirling flow. FIG. 5 is a vertical sectional view of the nozzle in FIG. 1. As shown in FIG. 5, a spray gas for forming a two-phase flow is fed along a wall surface of the liquid flow path to form a swirling two-phase flow. The swirling two-phase flow can prevent the liquid material from anchoring and accumulating on the inner wall surface of the nozzle, and clogging the nozzle after all.

Figure 9:
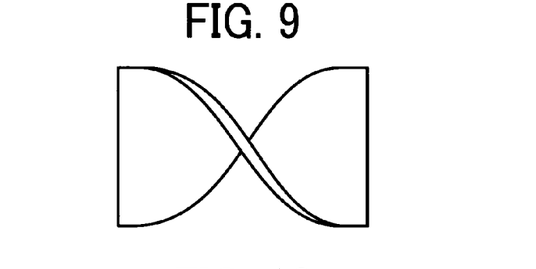
FIG. 9 is a schematic view illustrating a torque applicator optionally used in a nozzle for use in the method of preparing a powder of the present invention.
Figure 10:
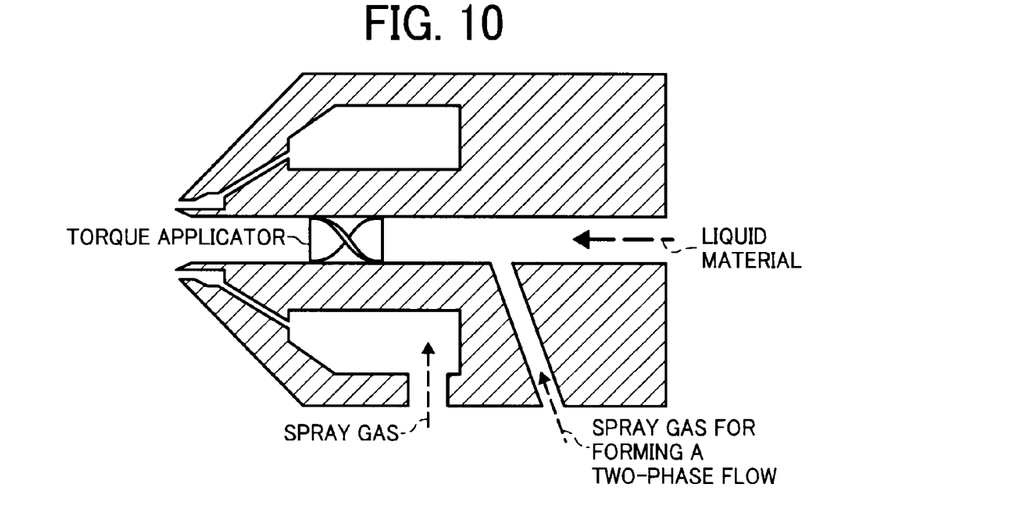
FIG. 10 is a schematic view illustrating a location of a torque applicator optionally used in a nozzle for use in the method of preparing a powder of the present invention.

A swirling flow can also be formed by a torque applicator on the two-phase flow path before bombarded to the spray gas after the two-phase flow is formed. The torque applicator includes a member such as baffle plate changing the direction of a flow to a specific direction in the flow path or a spiral grove formed on the wall of the flow path. Specific examples of the torque applicator includes a member such as a static mixer element as shown in FIG. 9. The member is located in a nozzle as shown in FIG. 10.

The spray gas (main flow) may be a swirling flow. Even the conventional spray granulator preferably has a swirling spray gas (main flow), and also in the present invention preferably has a swirling spray gas preventing the liquid material from adhering to the exit of the nozzle and the nozzle from clogging.

The method of the present invention can be used for preparing a toner for electrophotography. The method of using the apparatus having the above-mentioned configuration to prepare toner particles prepared less coarse particles due to adherence of the materials to the nozzle and clogged nozzle.

A toner prepared by the method of the present invention has less coarse particles than the conventional spray granulation methods and a sharp particle diameter distribution.

The two-phase flow path preferably has a length not less than 4 times as long as that of a circle-conversion diameter D of a hole discharging the two-phase flow. Thus, a stable two-phase flow can be discharged from the hole, stably bombarded to the spray gas and the resultant spray conditions are stabilized.

Figure 11:
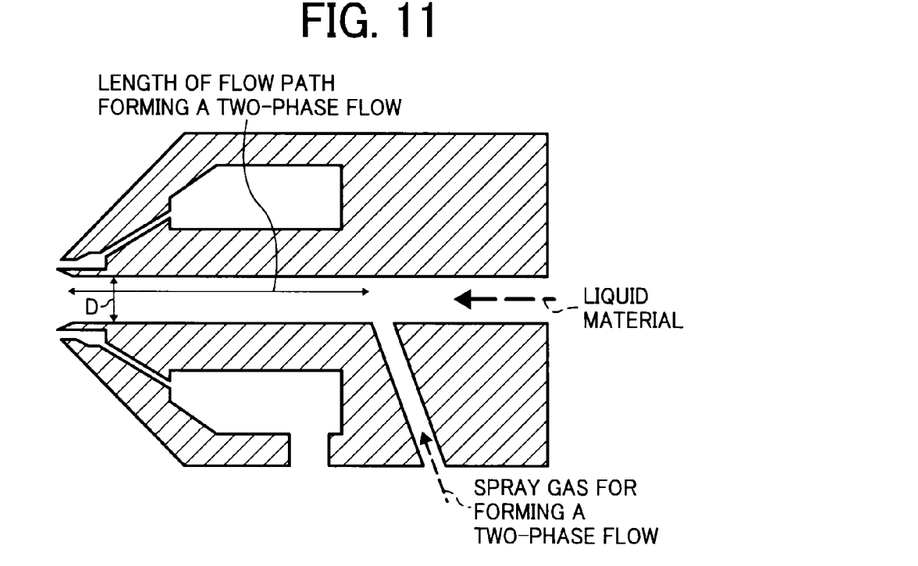
FIG. 11 is a schematic view illustrating a length of a flow path in which a two-phase flow is formed and a diameter of a hole discharging the two-phase flow.

When the two-phase flow path is too short, the two-phase flow is discharged from the hole before the formation thereof is stabilized, resulting in uneven discharge. When the formation of a two-phase flow is not stabilized, the air and the liquid are not mixed well therein and air bubbles and droplets therein do not have sufficiently small particle diameters. Therefore, the two-phase flow path having a length not less than 4 times as long as that of a hole discharging the two-phase flow can prepare particles having a sharp particle diameter distribution. FIG. 11 is a schematic view illustrating a length of a flow path in which a two-phase flow is formed and a diameter of a hole discharging the two-phase flow.

A process flow when the method of the present invention is used for a spray granulator preparing a toner for electrophotography will be explained according to FIG. 2.

Toner materials including a resin, colorant and other constituents are fed to the spray nozzle through the pump from the material holder in the state of a meltage or a solution, and sprayed into the collection chamber with the spray gas.

The sprayed particles are transferred to the collector with an air flow fed to the collection chamber.

The temperature of the air flow is adjusted by a temperature adjustor. The temperature is measured by a suction temperature measurer (T1). The exhaust temperature is measured by an exhaust thermometer (T2). The temperature of the spay gas may be adjusted by a temperature adjustor (T3).

An alternative is that toner materials including a resin, a colorant and other constituents are fed to the spray nozzle in the state of a solution in an organic solvent, and after sprayed in a fine particle state, the toner material exchanges heat with an air flow heated higher than an outer air to vaporize the solvent and is collected by the collector. The air flow is preferably heated to have a temperature not less than 30° C. and less than 150° C., more preferably not less than 40° C. and less than 130° C., and furthermore preferably not less than 45° C. and less than 100° C.

Another alternative is that toner materials including a resin, a colorant and other constituents are fed to the spray nozzle in the state of a heated meltage, and after sprayed in a fine particle state, the toner material exchanges heat with an air flow cooled to preferably have a temperature less than 60° C., more preferably less than 25° C. and furthermore preferably less than 10° C. to be cooled and solidified, and is collected by the collector. The spray nozzle preferably has a temperature of from 90 to 350° C., and more preferably from 150 to 320° C.

A further alternative is that a slurry in which toner materials are finely dispersed in a dispersion such as water and an organic solvent are fed to the spray nozzle, and after sprayed in a fine particle state, the toner material exchanges heat with an air flow heated higher than an outer air to vaporize the solvent and is collected by the collector. The air flow is preferably heated to have a temperature not less than 30° C. and less than 150° C., more preferably not less than 40° C. and less than 130° C., and furthermore preferably not less than 45° C. and less than 100° C.

The fine dispersion preferably has a median diameter not greater than 5 μm, more preferably not greater than 1 μm, and furthermore preferably not greater than 0.5 μm. The median diameter is measured by a laser diffraction particle diameter distribution measurer SALD-2000 from Shimadzu Corp.

Specific examples of the resin for the toner include styrene polymers and substituted styrene polymers such as polystyrene, poly-p-chlorostyrene and polyvinyltoluene; styrene copolymers such as a styrene-p-chlorostyrene copolymer, a styrene-vinyltoluene copolymer, a styrene-vinylnaphthalene copolymer, a styrene-acrylic ester copolymer, a styrene-methacrylic ester copolymer, a styrene-methyl α-chloromethacrylate copolymer, a styrene-acrylonitrile copolymer, a styrene-vinylmethylether copolymer, a styrene-vinylethylether copolymer, a styrene-vinyl methyl ketone copolymer, a styrene-butadiene copolymer, a styrene-isoprene copolymer and a styrene-acrylonitrile-indene copolymer; a polyvinylchloride resin; a phenol resin; a naturally-modified phenol resin; a natural-resin-modified maleic acid resin; an acrylic resin; a methacrylic resin; a polyvinylacetate resin; a silicone resin; a polyester resin; a polyurethane resin; a polyamide resin; a furan resin; an epoxy resin; a xylene resin; a polyvinylbutyral resin; a terpene resin; a coumarone indene resin; petroleum resins; etc. Among these resins, a styrene copolymer or a polyester resin is preferably used. These resins can be used alone or in combination.

Specific examples of the colorant include inorganic pigments such as chrome yellow, zinc yellow, barium yellow, Cadmium Yellow, zinc sulfide, antimony white, cadmium red, barium sulfate, lead sulfate, strontium sulfate, Chinese white, titanium white, colcothar, iron black, chrome oxide, aluminum hydroxide, calcium silicate, ultramarine blue, calcium carbonate, magnesium carbonate, carbon black, graphite, an aluminum powder and a bronze powder; and organic pigments such as Madder Lake, Rockwood Lake, Cochineal Lake, Naphthol Green B, Naphthol Green Y, Naphthol Yellow S, Lithol Fast Yellow 2G, PERMANENT RED 4R, Brilliant Fast Scarlet, HANSA YELLOW, Lithol Red, Lake Red C, Lake Red D, Brilliant Carmine 6B, Permanent Red F5R, Pigment Scarlet 3B, Bordeaux 10B, Phthalocyanine Blue, Phthalocyanine Green, Sky Blue, Rhodamine Lake, Malachite Green Lake, Eosine Lake, Quinoline Yellow Lake, INDANTHRENE BLUE, Thioindigo Maroon, Alizarine Lake, Quinacridone Red, perylene red, perylene scarlet, isoindolinone yellow, dioxazine violet and aniline black. These colorants can be used alone or in combination.

The toner preferably includes the colorant in an amount of from 1 to 15% by weight, and more preferably from 3 to 10% by weight.

When less than 1% by weight, the colorability of the toner deteriorates. When greater than 15% by weight, the colorant is not well dispersed in the toner, resulting in deterioration of colorability and electrical properties of the toner.

The toner preferably includes a wax as a release agent. Specific examples of the wax include plant waxes such as a candelilla wax, a carnauba wax and a rice wax; mineral waxes such as a montan wax and a ceresin wax; petroleum waxes such as a paraffin wax and a petrolatum wax; synthetic hydrocarbons such as polypropylene and polyethylene; hydrogenated waxes such as a hardened ricinus and ricinus derivatives; and aliphatic derivatives such as alcohols, esters, amides, imides, ketones and metallic soaps. These waxes can be used alone or in combination.

The wax preferably has a melting point of from 40 to 160° C., more preferably from 50 to 120° C., and furthermore preferably from 60 to 90° C. When less than 40° C., the heat resistant preservability of the resultant toner possibly deteriorates. When greater than 160° C., cold offset possibly occurs when the resultant toner is fixed at a low temperature and transfer papers are possibly twined around a fixer.

The toner preferably includes the wax in an amount of form 0 to 40 parts by weight, and more preferably from 3 to 30 parts by weight per 100 parts by weight of the toner. When greater than 40 parts by weight, the low-temperature fixability of the toner or the resultant image quality (too high glossiness) possibly deteriorates.

The toner preferably includes a charge controlling agent.

Specific examples of the charge controlling agent include any known charge controlling agents, preferably colorless or almost white materials because of not changing the color tone of the toner, such as Nigrosine dyes, triphenylmethane dyes, metal complex dyes including chromium, molybdic acid chelate pigments, Rhodamine dyes, alkoxyamines, quaternary ammonium salts (including fluorine-modified quaternary ammonium salts), alkylamides, phosphor and compounds including phosphor, tungsten and compounds including tungsten, fluorine-containing activators, and metal salts of salicylic acid and of salicylic acid derivatives. Among these charge controlling agents, metal salts of salicylic acid and of salicylic acid derivatives are preferably used. These can be used alone or in combination.

The metal salts include any known metals such as aluminum, zinc, titanium, strontium, boron, silicon, nickel, iron, chrome and zirconium.

Specific examples of the marketed products of the charge controlling agents include a quaternary ammonium salt BONTRON P-51, a metal complex of oxynaphthoic acids E-82, a metal complex of salicylic acids E-84 and a phenolic condensation product E-89, which are manufactured by Orient Chemical Industries Co., Ltd.; molybdenum complex of quaternary ammonium salts TP-302 and TP-415, which are manufactured by Hodogaya Chemical Co. Ltd.; a quaternary ammonium salt COPY CHARGE PSY VP2038, a triphenyl methane derivative COPY BLUE, quaternary ammonium salts COPY CHARGE NEG VP2036 and NX VP434, which are manufactured by Hoechst AG; LRA-901 and a boron complex LR-147, which are manufactured by Japan Carlit Co., Ltd.; quinacridone; azo pigments; polymeric compounds having functional groups such as a sulfonic acid group, a carboxyl group and a quaternary ammonium salt; etc.

The charge controlling agent may be dissolved or dispersed in a toner after melted and kneaded with a masterbatch, directly added in an organic solvent with the toner constituents, or fixed on a toner after produced.

The content of the charge controlling agent is determined depending on the species of the binder resin used, whether or not an additive is added and toner manufacturing method (such as dispersion method) used, and is not particularly limited. However, the content thereof is typically from 0.1 to 10 parts by weight, and preferably from 1 to 5 parts by weight, per 100 parts by weight of the binder resin included in the toner. When less than 0.1 parts by weight, the chargeability of the resultant toner possibly deteriorates. When greater than 10 parts by weight, the toner has too large charge quantity, and thereby the electrostatic force of a developing roller attracting the toner increases, resulting in deterioration of the fluidity of the toner and image density of the toner images.

The organic solvent for use in the present invention is not particularly limited, provided the toner constituents are soluble or dispersible therein. The organic solvent is preferably volatile, having a boiling point less than 150° C. in terms of removability.

Specific examples of the organic solvent include alcohols such as methyl alcohol, ethyl alcohol, denatured alcohol, isopropyl alcohol, n-butyl alcohol, isobutyl alcohol, tert-butyl alcohol, sec-butyl alcohol, tert-amyl alcohol, 3-pentanol, octyl alcohol, benzyl alcohol, cyclohexanol, furfuryl alcohol, tetrahydrofurfuryl alcohol, ethylene glycol, glycerin, and diethylene glycol; ether alcohols such as methylcellosolve, cellosolve, isopropyl cellosolve, butyl cellosolve, ethylene glycol monomethyl ether, ethylene glycol monoethyl ether, diethylene glycol monomethyl ether, and diethylene glycol monoethyl ether; hydrocarbons such as hexane, octane, petroleum ether, cyclohexane, benzene, toluene and xylene; halogenated hydrocarbons such as carbon tetrachloride, trichloroethylene, and tetrabromoethane; ethers such as ethyl ether, dimethyl glycol, trioxane, and tetrahydrofuran; acetals such as methylal and diethyl acetal; ketones such as acetone, methyl ethyl ketone, methyl isobutyl ketone and cyclohexanone; esters such as butyl formate, butyl acetate, ethyl propionate, and cellosolve acetate; acids such as formic acid, acetic acid and propionic acid; compounds having a sulfur atom or a nitrogen atom such as nitropropene, nitrobenzene, dimethylamine, monoethanolamine, pyridine, dimethylsulfoxide and dimethylformamide; water; etc. Toluene, xylene, benzene, carbon tetrachloride, methylene chloride, 1,2-dichloroethane, 1,1,2-trichloroethane, trichloroethylene, chloroform, monochlorobenzene, dichloroethylidene, methylacetate, ethylacetate, methylethylketone and methylisobutylketone are preferably used. Toluene, xylene, methylethylketone and ethylacetate are more preferably used. These can be used alone or in combination.

100 parts by weight of the toner constituents are preferably dissolved or dispersed in 100 to 2,000 parts by weight, more preferably from 200 to 1,500 parts by weight, and further more preferably from 300 to 1,000 parts by weight of the organic solvent.

The average particle diameter and particle diameter distribution of the toner can be measured by a Coulter counter TA-II or Coulter Multisizer II from Beckman Coulter, Inc. as follows:

0.1 to 5 ml of a detergent, preferably alkylbenzene sulfonate is included as a dispersant in 100 to 150 ml of the electrolyte ISOTON R-II from Coulter Scientific Japan, Ltd., which is a NaCl aqueous solution including an elemental sodium content of 1%;

2 to 20 mg of a toner sample is included in the electrolyte to be suspended therein, and the suspended toner is dispersed by an ultrasonic disperser for about 1 to 3 min to prepare a sample dispersion liquid; and a volume and a number of the toner particles for each of the following channels are measured by the above-mentioned measurer using an aperture of 100 µm to determine a weight distribution and a number distribution:

2.00 to 2.52 µm; 2.52 to 3.17 µm; 3.17 to 4.00 µm; 4.00 to 5.04 µm; 5.04 to 6.35 µm; 6.35 to 8.00 µm; 8.00 to 10.08 µm; 10.08 to 12.70 µm; 12.70 to 16.00 µm; 16.00 to 20.20 µm; 20.20 to 25.40 µm; 25.40 to 32.00 µm; and 32.00 to 40.30 µm.

The volume-average particle diameter (Dv) of a toner and number-average particle diameter (Dn) thereof can be measured based the distributions.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Figure 8:
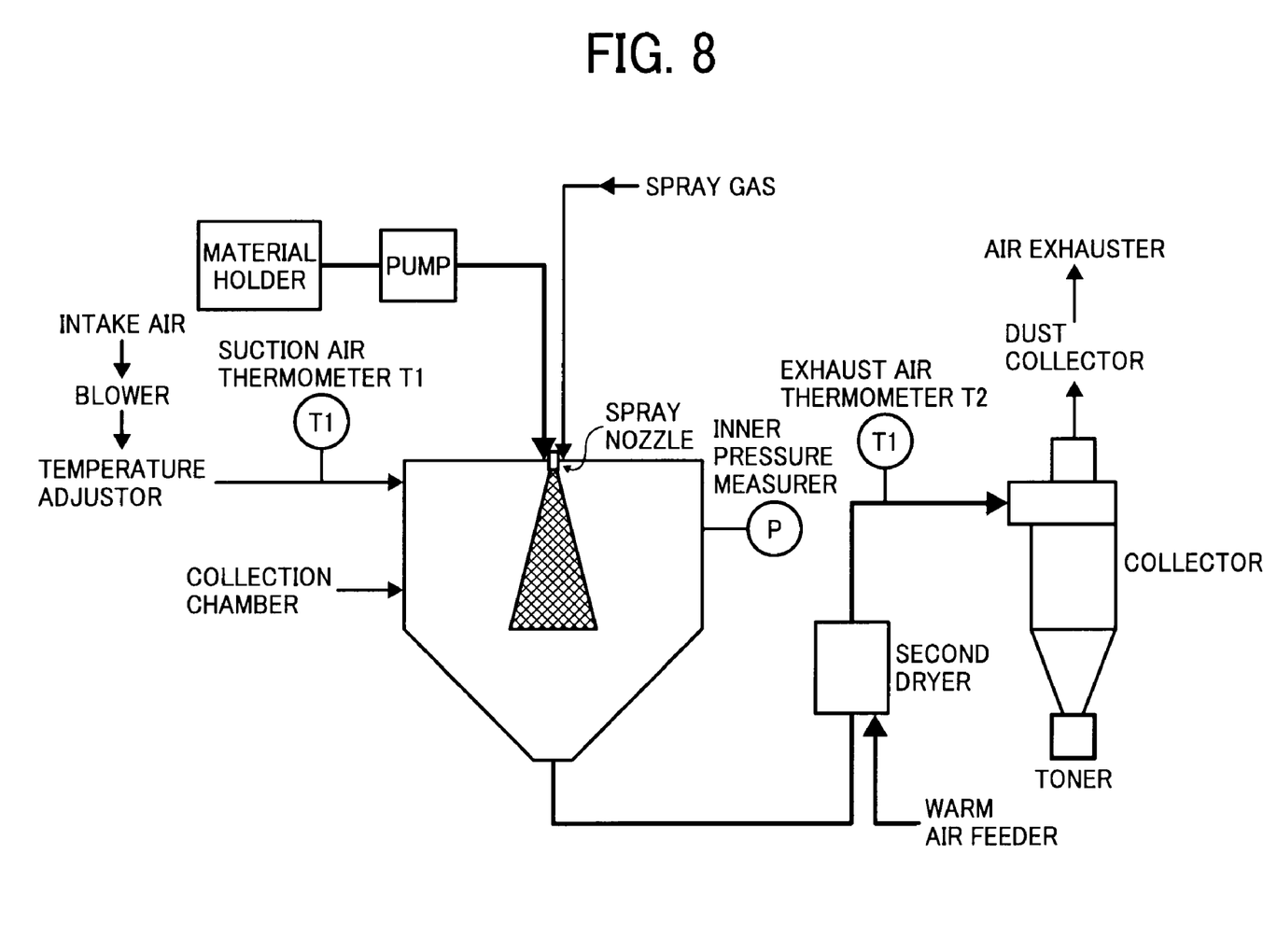
FIG. 8 is another process flow of the spray granulation method of preparing a powder of the present invention.

Toner particles were prepared by the spray granulator in FIG. 8 with the following toner material (a mixture of a liquid solution and a dispersion slurry) while changing the structure of the nozzle. Dv and Dn were measured to evaluate Dv/Dn.

The smaller Dv/Dn, the better, and needs to be less than 1.35 for a toner for high-quality images.

Other conditions except for the nozzle were same.

When the spray nozzle stably performs spraying, particles having a sharp particle diameter distribution can be prepared. Therefore, the smaller Dv/Dn, the better.

In addition, the smaller Dv, the more efficiently fine particles are prepared.

<Preparation of Toner Solution>

<<Synthesis of Low-Molecular-Weight Polyester>>

220 parts of an adduct of bisphenol A with 2 moles of ethyleneoxide, 561 parts of an adduct of bisphenol A with 3 moles of propyleneoxide, 218 parts terephthalic acid, 48 parts of adipic acid and 2 parts of dibutyltinoxide were polycondensated in a reactor vessel including a cooling pipe, a stirrer and a nitrogen inlet pipe at a normal pressure and 230° C. for 8 hrs. Further, after the mixture was depressurized by 10 to 15 mm Hg and reacted for 5 hrs, 45 parts of trimellitic acid anhydride were added thereto and the mixture was reacted at a normal pressure and 180° C. for 3 hrs to prepare a low-molecular-weight polyester.

The low-molecular-weight polyester had a number-average molecular weight (Mn) of 2,500, a weight-average molecular weight (Mw) of 6,700, a glass transition temperature (Tg) of 43° C. and an acid value of 25.

<<Preparation of Masterbatch MB)>>

30 parts of water, 50 parts of a copper phthalocyanine pigment LIONOL NLUE FG-7351 from Toyo Ink Mfg. Co., Ltd. and 50 parts of a polyester resin RS301 having an acid value of 10, a Mw of 20,000 and a Tg of 64° C. from Sanyo Chemical Industries, Ltd. were mixed by a HENSCHELL MIXER from Mitsui Mining Co., Ltd. After the mixture was kneaded by a two-roll mill having a surface temperature of 130° C. for 45 min, the mixture was rolled, cooled and pulverized by a pulverizer from Hosokawa Micron Corporation to prepare a masterbatch.

<<Preparation of Toner Pre-Solution>>

119.88 parts of the low-molecular-weight polyester, 20.0 parts of carnauba wax, 12.0 parts of a wax dispersant including 30 parts of a polyethylene wax grafted with 70 parts of styrene-butylacrylate ester copolymer, 4.0 parts a charge controlling agent, i.e., a salicylic acid metal complex E-84 from Orient Chemical Industries Co., Ltd., 20.0 parts of the masterbatch and 200.0 parts of ethylacetate were mixed in a reaction vessel including a stirrer and a thermometer. The mixture was heated to have a temperature of 80° C. while stirred. After the temperature of 80° C. was maintained for 5 hrs, the mixture was cooled to have a temperature of 30° C. in an hour to prepare a material solution/dispersion.

The material solution/solution were dispersed by a beads mill (Ultra Visco Mill from IMECS CO., LTD.) for 3 passes at a liquid feeding speed of 1 kg/hr, a peripheral disc speed of 6 m/sec with zirconia beads having diameter of 0.5 mm for 80% by volume to disperse the copper phthalocyanine pigment and carnaubawax. Thus, a toner pre-solution was prepared, in which the carnauba wax had a median diameter of 0.3 µm.

<<Synthesis of Prepolymer>>

682 parts of an adduct of bisphenol A with 2 moles of ethyleneoxide, 81 parts of an adduct of bisphenol A with 2 moles of propyleneoxide, 283 parts terephthalic acid, 22 parts of trimellitic acid anhydride and 2 parts of dibutyltinoxide were mixed and reacted in a reactor vessel including a cooling pipe, a stirrer and a nitrogen inlet pipe for 8 hrs at a normal pressure and 230° C. Further, after the mixture was depressurized by 10 to 15 mm Hg and reacted for 5 hrs to prepare an intermediate polyester resin.

The intermediate polyester resin had a number-average molecular weight of 2,100, a weight-average molecular weight of 9,500, a Tg of 55° C. and an acid value of 0.5 mg KOH/g and a hydroxyl value of 51 mg KOH/g.

Next, 410 parts of the intermediate polyester resin, 89 parts of isophoronediisocyanate and 500 parts of ethyl acetate were reacted in a reactor vessel including a cooling pipe, a stirrer and a nitrogen inlet pipe for 5 hrs at 100° C. to prepare a prepolymer. The prepolymer included a free isocyanate in an amount of 1.53% by weight.

<<Synthesis of Ketimine>>

170 parts of isophoronediamine and 75 parts of methyl ethyl ketone were reacted at 50° C. for 5 hrs in a reaction vessel including a stirrer and a thermometer to prepare a ketimine compound. The ketimine compound had an amine value of 418 mg KOH/g.

<<Preparation of Toner Solution/Dispersion>>

Ethylacetate was added to the toner pre-solution to have a solid concentration of 50% by weight, and 187.94 parts of the toner pre-solution, 11.46 parts of the prepolymer and 0.6 parts of the ketimine compound were mixed in a vessel by a TK-type homomixer from Tokushu Kika Kogyo Co., Ltd. at 5,000 rpm for 1 min to prepare a mixture. Further, ethylacetate was added thereto to have a solid concentration of 10 parts by weight, the mixture was mixed by a TK-type homomixer from Tokushu Kika Kogyo Co., Ltd. at 5,000 rpm for 1 min to prepare a toner solution/dispersion.

<<Spray Process>>

The toner solution/dispersion (hereinafter referred to as a liquid material) was sprayed by the apparatus in FIG. 8.

The liquid material was fed to the spray nozzle by the tubing pump and sprayed into the collection chamber with the spray gas separately fed. A transfer gas having a temperature of 80° C. was separately fed into the collection chamber by the air blower and temperature adjustor. The liquid material was transferred to the second drier (flash jet drier from SEISHIN ENTERPRISE CO., LTD. and collected by the collector (cyclone). The resultant toner particle include the solvent component less than 300 ppm when measured by gas chromatography. The conditions of each spray nozzle in Examples 1 to 5 and Comparative Examples 1 to 3 are shown in Table 1. The differences were only gas feeding methods of the spray nozzles, and amounts used, clearances and shapes of the liquid flow path exits and spray gas (mainstream) were same. A ratio in Table 1 between the amount of air used for spraying and the amount of air used for forming a two-phase flow is a weight ratio.

Comparative Example 1

As a typical inner mixing type spray nozzle, a spray set up No. SU12A (liquid caps PF2050 and PA73160) from Spraying Systems Co., Japan as shown in FIG. 6 was used.

Comparative Example 2

The evaluation the resultant toner in Comparative Example 1 was repeated except for using a typical external mixing type spray nozzle AM45S from Atomax Co., Ltd., which is disclosed in Japanese published unexamined applications Nos. 2003-001090 and 2000-254554 showing a structure thereof in FIG. 7.

Comparative Example 3

Figure 1:
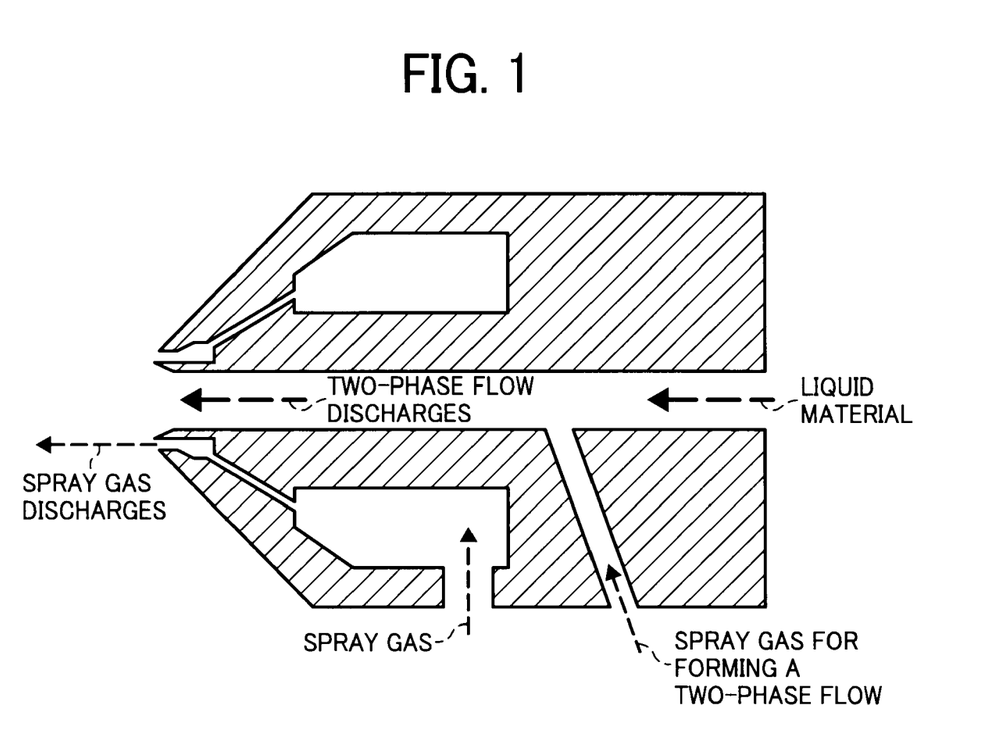
FIG. 1 is a schematic view illustrating a cross-section of a nozzle for use in the method of preparing a powder of the present invention.

The evaluation the resultant toner in Comparative Example 2 was repeated except for modifying the liquid flow path of AM45S such that a gas for forming a two-phase flow is simply mixed therein to form a two-phase flow, having the inner structure in FIG. 1.

Example 1

The evaluation the resultant toner in Comparative Example 3 was repeated except for changing the amount of air used for spraying and the amount of air used for forming a two-phase flow.

Example 2

The evaluation the resultant toner in Comparative Example 2 was repeated except for modifying the liquid flow path of AM45S such that a swirling gas for forming a two-phase flow is mixed therein to form a two-phase flow, having the inner structure combined with FIGS. 1 and 5.

Example 3

The evaluation the resultant toner in Comparative Example 2 was repeated except for modifying the liquid flow path of AM45S such that a gas for forming a two-phase flow is mixed therein by a venturi method to form a two-phase flow, having the inner structure in FIG. 3.

Example 4

The evaluation the resultant toner in Comparative Example 2 was repeated except for modifying the liquid flow path of AM45S such that a gas for forming a two-phase flow is mixed therein by an ejector method to form a two-phase flow, having the inner structure in FIG. 4.

Example 5

The evaluation the resultant toner in Example 2 was repeated except for changing the amount of air used for spraying and the amount of air used for forming a two-phase flow.

TABLE 1

|  | Two-phase flow formation | Two-phase flow formation method | Air amount ratio for spraying | Air amount ratio for two-phase flow |
|---|---|---|---|---|
| Comparative Example 1 | Inner Mixing | None | — | 1 | 0 |
| Comparative Example 2 | External Mixing | None | — | 1 | 0 |
| Comparative Example 3 | Two-phase flow | Yes | Simple mixing | 0.5 | 0.5 |

TABLE 1-continued

|  | Two-phase flow formation | Two-phase flow formation method | Air amount ratio for spraying | Air amount ratio for two-phase flow |
|---|---|---|---|---|
| Example 1 | external mixing | Simple mixing | 0.9 | 0.1 |
| Example 2 |  | Swirl | 0.9 | 0.1 |
| Example 3 |  | Venturi | 0.9 | 0.1 |
| Example 4 |  | Ejector | 0.9 | 0.1 |
| Example 5 |  | Swirl | 0.7 | 0.3 |

Measurement results of Dv and Dn in Examples 1 to 5 and Comparative Examples 1 to 3 are shown in Table 2.

TABLE 2

|  | Dv (μm) | Dn (μm) | Dv/Dn |
|---|---|---|---|
| Comparative Example 1 | 6.81 | 4.66 | 1.46 |
| Comparative Example 2 | 7.13 | 4.99 | 1.43 |
| Comparative Example 3 | 7.19 | 4.96 | 1.45 |
| Example 1 | 6.38 | 4.95 | 1.29 |
| Example 2 | 6.33 | 5.36 | 1.18 |
| Example 3 | 6.15 | 5.04 | 1.22 |
| Example 4 | 6.19 | 5.20 | 1.19 |
| Example 5 | 6.37 | 5.54 | 1.15 |

Table 2 shows that Dv/Dn in Examples 1 to 5 are favorably lower than those in Comparative Examples 1 to 3, in addition, Dv in Examples are on the whole lower, which proves toner particles having a small particle diameter and a sharp particle diameter distribution are efficiently prepared.

The spray nozzle in Comparative Example 3 is the same nozzle in Example 1, however, Dv/Dn was not improved because of a unsuitable ratio between the amount of air used for spraying and the amount of air used for forming a two-phase flow. However, Examples 2 and 5 show that Dv/Dn was fully improved when the ratio therebetween is in a suitable range. In Examples, venturi and ejector made Dv smaller and more efficiently prepared toner particles, and swirling flow made Dv/Dn smaller. However, the results are almost same and they all have good performances.

Comparative Example 4

The evaluation the resultant toner in Comparative Example 2 was repeated except for modifying the liquid flow path of AM45S such that a gas for forming a two-phase flow is simply mixed therein to form a two-phase flow, having the inner structure in FIG. 1, wherein the two-phase flow path has a length 10 times as long as a circle-conversion diameter D of a hole discharging the two-phase flow.

Comparative Example 5

The evaluation the resultant toner in Comparative Example 4 was repeated except for changing the amount of air used for spraying and the amount of air used for forming a two-phase flow.

Example 6

The evaluation the resultant toner in Comparative Example 2 was repeated except for modifying the liquid flow path of AM45S such that a gas for forming a two-phase flow is simply mixed therein to form a two-phase flow, having the inner structure combined with FIGS. 1 and 5, wherein the two-phase flow path has a length 10 times as long as a circle-conversion diameter D of a hole discharging the two-phase flow.

Example 7

The evaluation the resultant toner in Comparative Example 2 was repeated except for modifying the liquid flow path of AM45S such that a swirling gas for forming a two-phase flow is mixed therein to form a two-phase flow, having the inner structure combined with FIGS. 1 and 5, wherein the two-phase flow path has a length 10 times as long as a circle-conversion diameter D of a hole discharging the two-phase flow.

Example 8

The evaluation the resultant toner in Comparative Example 2 was repeated except for modifying the liquid flow path of AM45S such that a gas for forming a two-phase flow is mixed therein by a venturi method to form a two-phase flow, having the inner structure in FIG. 3, wherein the two-phase flow path has a length 10 times as long as a circle-conversion diameter D of a hole discharging the two-phase flow.

Example 9

The evaluation the resultant toner in Comparative Example 2 was repeated except for modifying the liquid flow path of AM45S such that a gas for forming a two-phase flow is mixed therein by an ejector method to form a two-phase flow, having the inner structure in FIG. 4, wherein the two-phase flow path has a length 10 times as long as a circle-conversion diameter D of a hole discharging the two-phase flow.

Example 10

The evaluation the resultant toner in Example 7 was repeated except for changing the amount of air used for spraying and the amount of air used for forming a two-phase flow.

Example 11

The evaluation the resultant toner in Example 8 was repeated except for inserting the element in FIG. 9 in the nozzle as a torque applicator to the two-phase flow to be swirled.

Example 12

The evaluation the resultant toner in Comparative Example 2 was repeated except for modifying the liquid flow path of AM45S such that a gas for forming a two-phase flow is simply mixed therein to form a two-phase flow, having the inner structure in FIG. 1, wherein the two-phase flow path has a length 3.5 times as long as a circle-conversion diameter D of a hole discharging the two-phase flow.

Example 13

The evaluation the resultant toner in Comparative Example 2 was repeated except for modifying the liquid flow path of AM45S such that a gas for forming a two-phase flow is simply mixed therein to form a two-phase flow, having the inner structure in FIG. 1, wherein the two-phase flow path has a length 4.5 times as long as a circle-conversion diameter D of a hole discharging the two-phase flow.

Example 14

The evaluation the resultant toner in Example 6 was repeated except for changing the amount of air used for spraying and the amount of air used for forming a two-phase flow.

The conditions of each spray nozzle in Examples 6 to 14 and Comparative Examples 4 and 5 are shown in Table 3.

TABLE 3

| | Two-phase flow formation method | Air amount ratio for spraying | Air amount ratio for two-phase flow |
|---|---|---|---|
| Comparative Example 4 | Simple mixing | 0.5 | 0.5 |
| Comparative Example 5 | Simple mixing | 0.97 | 0.03 |
| Example 6 | Simple mixing | 0.9 | 0.1 |
| Example 7 | Swirling | 0.9 | 0.1 |
| Example 8 | Venturi | 0.9 | 0.1 |
| Example 9 | Ejector | 0.9 | 0.1 |
| Example 10 | Swirling | 0.7 | 0.3 |
| Example 11 | Swirling + Torque | 0.7 | 0.3 |
| Example 12 | Simple mixing (3.5D) | 0.9 | 0.1 |
| Example 13 | Simple mixing (4.5D) | 0.9 | 0.1 |
| Example 14 | Simple mixing | 0.7 | 0.3 |

Measurement results of Dv and Dn in Examples 6 to 14 and Comparative Examples 4 and 5 are shown in Table 4.

TABLE 4

| | Dv (μm) | Dn (μm) | Dv/Dn |
|---|---|---|---|
| Comparative Example 4 | 7.19 | 4.96 | 1.45 |
| Comparative Example 5 | 7.15 | 4.93 | 1.45 |
| Example 6 | 6.38 | 4.95 | 1.29 |
| Example 7 | 6.33 | 5.36 | 1.18 |
| Example 8 | 6.15 | 5.04 | 1.22 |
| Example 9 | 6.19 | 5.20 | 1.19 |
| Example 10 | 6.37 | 5.54 | 1.15 |
| Example 11 | 6.13 | 5.42 | 1.13 |
| Example 12 | 6.54 | 4.95 | 1.32 |
| Example 13 | 6.40 | 4.96 | 1.29 |
| Example 14 | 6.42 | 5.10 | 1.26 |

Table 4 shows that Dv/Dn in Examples 6 to 14 are favorably lower than those in Comparative Examples 4 and 5, in addition, Dv in Examples are on the whole lower, which proves toner particles having a small particle diameter and a sharp particle diameter distribution are efficiently prepared.

Each of the spray nozzles in Comparative Examples 4 and 5 is the same nozzle in Example 6, however, Dv/Dn was not improved because of a unsuitable ratio between the amount of air used for spraying and the amount of air used for forming a two-phase flow. However, Examples 7, 10 and 14 show that Dv/Dn was fully improved when the ratio therebetween is in a suitable range. In Examples, venturi and ejector made Dv smaller and more efficiently prepared toner particles, and swirling flow made Dv/Dn smaller. However, the results are almost same and they all have good performances. In addition, Examples 6, 12 and 13 show that Dv becomes less and Dv/Dn, i.e., the particle diameter distribution becomes sharper when the two-phase flow path has a length not less than 4D than to have less than 4D.

This application claims priority and contains subject matter related to Japanese Patent Applications Nos. 2007-125327 and 2008-049121, filed on May 10, 2007, and Feb. 29, 2008, respectively, the entire contents of each of which are hereby incorporated by reference.

Having now fully described the invention, it will be apparent to one of ordinary skill in the art that many changes and modifications can be made thereto without departing from the spirit and scope of the invention as set forth therein.

What is claimed as new and desired to be secured by Letters Patent of the United States is:

1. A method of preparing a powder, comprising:
bombarding a spray gas to a liquid material through a spray nozzle to form an atomized liquid material; and
solidifying the atomized liquid material,
wherein 5 to 40% by weight of the spray gas are previously mixed with the liquid material to form a two-phase flow in a flow path of the spray nozzle, and 60 to 95% by weight of the spray gas is further discharged from a circumference of the flow path discharging the two-phase flow and bombarded thereto to uniformly atomize the liquid material.

2. The method of claim 1, wherein the spray nozzle is a venturi nozzle.

3. The method of claim 1, wherein the spray nozzle is an ejector nozzle.

4. The method of claim 1, wherein the spray nozzle is a ring nozzle.

5. The method of claim 1, wherein the two-phase flow is a swirling flow.

6. The method of claim 1, wherein the spray gas is a swirling flow.

7. The method of claim 1, wherein the flow path comprises a torque applicator.

8. The method of claim 1, wherein the flow path has a length not less than 4 times as long as a diameter of a hole discharging the two-phase flow.

9. A method of preparing a toner, wherein the toner is prepared by the method according to claim 1.

* * * * *